Oct. 28, 1958  A. E. STRANG  2,858,085
CONTROLLED POWER DRIVEN REEL
Filed May 7, 1956  4 Sheets-Sheet 3
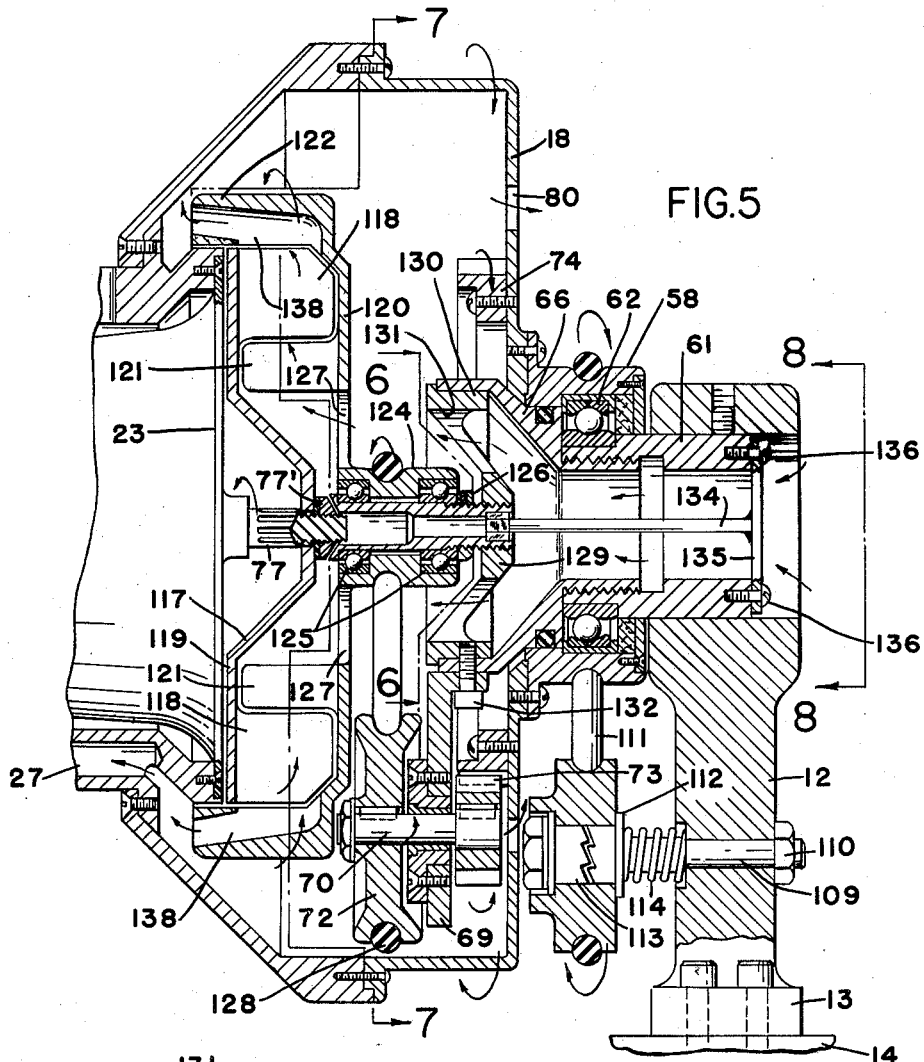
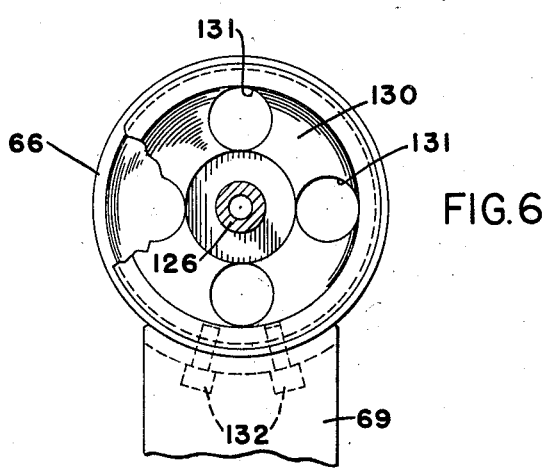
INVENTOR.
ALVIN E. STRANG
BY Ely, Fryed Hamilton
ATTORNEYS Oct. 28, 1958  A. E. STRANG  2,858,085
CONTROLLED POWER DRIVEN REEL
Filed May 7, 1956  4 Sheets-Sheet 4

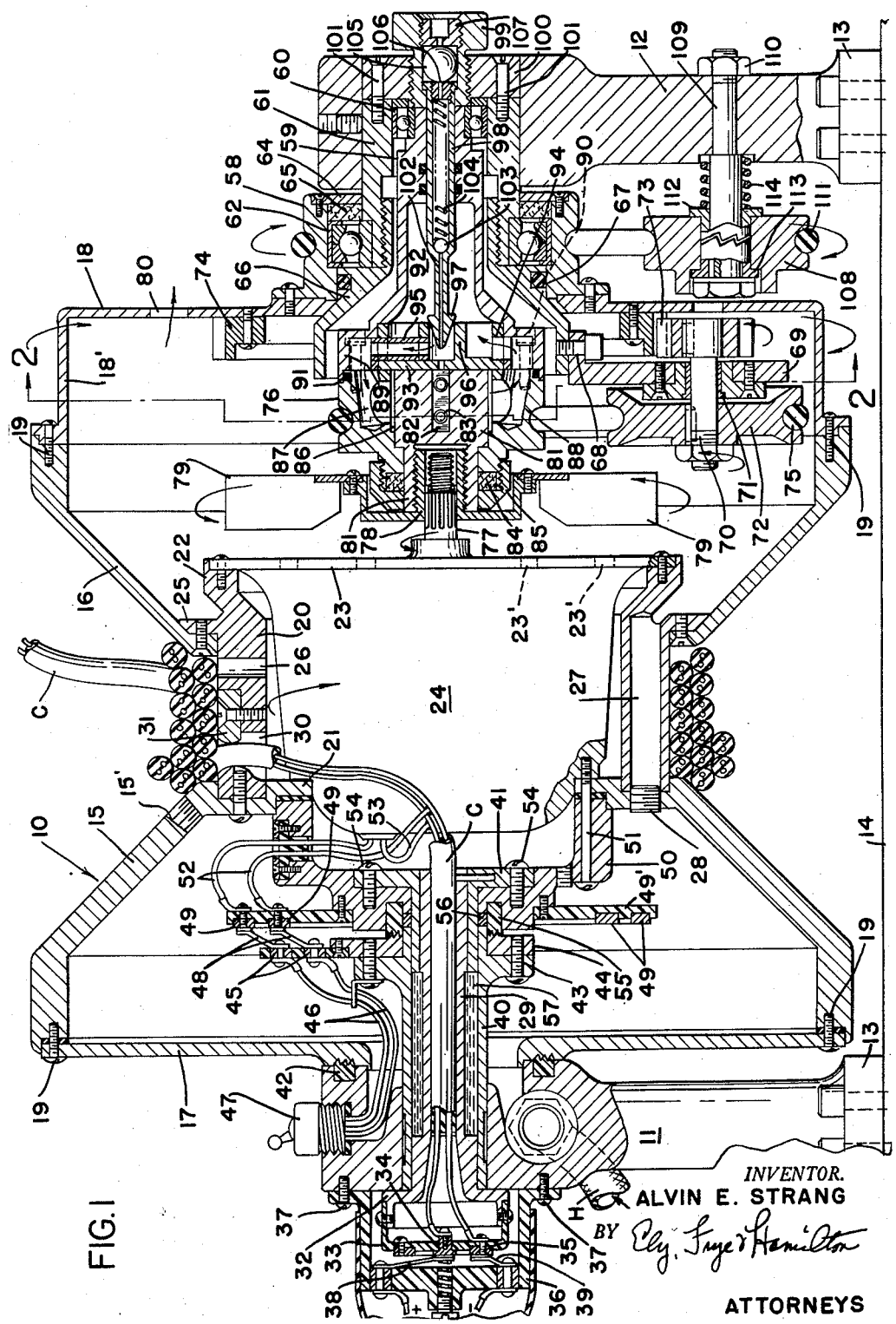

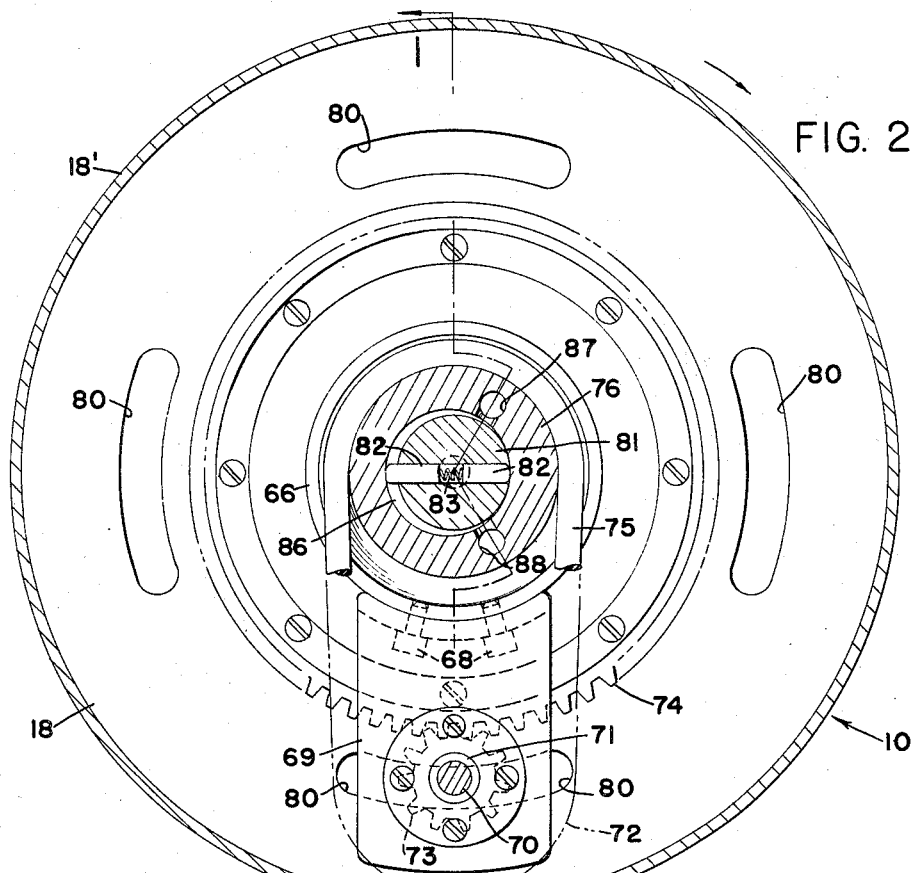
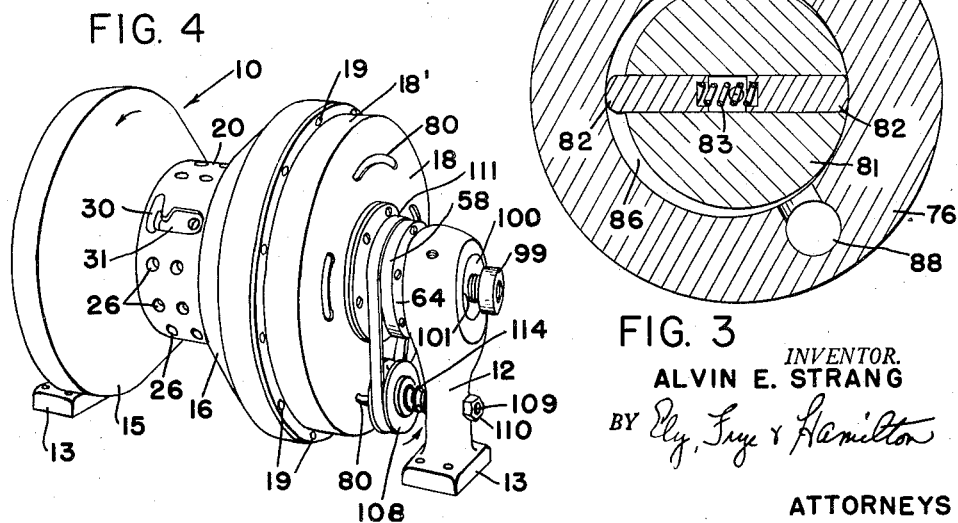

*INVENTOR.*
ALVIN E. STRANG
BY *Ely, Frye & Hamilton*
ATTORNEYS

United States Patent Office 2,858,085
Patented Oct. 28, 1958

2,858,085

CONTROLLED POWER DRIVEN REEL

Alvin E. Strang, Canton, Ohio

Application May 7, 1956, Serial No. 583,150

14 Claims. (Cl. 242—54)

The invention relates generally to cord retrievers and power driven reels for retrieving or reeling in long lengths of flexible cords, cables or conduits, and more particularly to an improved reel for applying uniform tension to the cord throughout its full length.

Certain prior power driven reels have been driven by an electric motor, but the power could only be applied when the reel was winding in cord, and if the load exceeded the capacity of the motor, the motor stalled. Accordingly, the motor was selected for the maximum load requirement for which the reel was designed, but if the maximum load was exceeded by stopping the reel, the motor stalled. Thus, the motor had to be started and stopped each time the reel was operated.

The present invention mounts an electric motor in the reel in such manner that both the direct torque on the armature and the reaction torque on the field may drive the reel in its take-up direction, and the direct torque is adjustably controlled by a fluid drive connection to maintain a uniform tension on the cord and allow it to be reeled or unreeled without stalling the motor.

The use of reaction torque on a motor field to drive a reel is disclosed in my prior Patent No. 2,487,395, dated November 8, 1949, in which the fan motor housing in a vacuum cleaner is rotatable in the housing and is shaped to form a reel for the electric cord. The reaction torque on the motor housing is used to retrieve the cord, the torque on the armature shaft being used to drive the suction fan.

In the reel of the present invention, the torque on the armature shaft is geared back to the reel housing in which the motor housing is mounted, but the drive from the shaft to the gearing is a fluid drive which is adjustably controlled by a valve, with respect to the amount of power it transmits. Thus, if the fluid drive is adjusted to transmit a predetermined maximum amount of power, when the load exceeds the total of that amount and the amount transmitted by he reaction torque on the motor field, the fluid drive cushions the pull on the reel and allows slippage between the armature shaft and the gearing so that the shaft continues to rotate without stalling the motor.

Accordingly, an object of the present invention is to provide an improved motor driven reel having an adjustable fluid drive for retrieving a cord and the like with uniform cushioned tension as the cord is reeled in or unreeled.

Another object is to provide an improved power driven reel having means to prevent stalling due to overload.

A further object is to provide an improved motor driven reel which combines the direct torque on the motor armature with the reaction torque on the motor field in such manner as to control the power applied to the reel.

Another object is to provide a compact, portable, motor driven reel which is adapted for use as a retriever and storage reel, as a winch, as a towing reel, and as a drive for belts, cables, chains and the like.

These and other objects are accomplished by the improvements constituting the present invention, preferred embodiments of which are shown by way of example in the accompanying drawings and described in detail herein. Various modifications and changes in construction are comprehended within the scope of the appended claims.

Referring to the drawings forming part hereof:

Fig. 1 is a sectional view of a preferred embodiment of the cord retriever taken substantially on line 1—1 of Fig. 2, showing one form of fluid drive.

Fig. 2 is a transverse sectional view taken substantially on line 2—2 of Fig. 1.

Fig. 3 is an enlarged fragmentary sectional view corresponding to the central portion of Fig. 2.

Fig. 4 is a perspective view of the cord retriever of Fig. 1.

Fig. 5 is a fragmentary sectional view similar to Fig. 1, showing another form of fluid drive.

Fig. 6 is a transverse sectional view on line 6—6 of Fig. 5.

Figure 7:
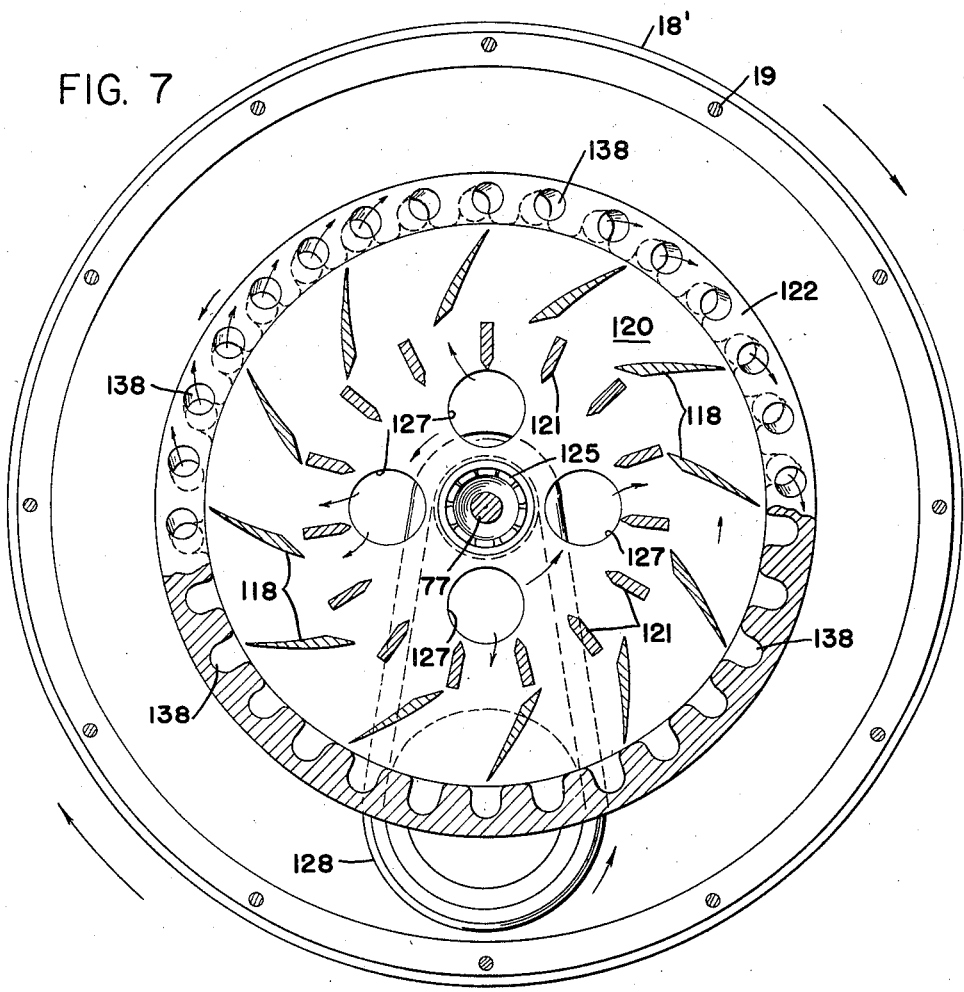
Fig. 7 is a transverse sectional view on line 7—7 of Fig. 5.
Figure 8:
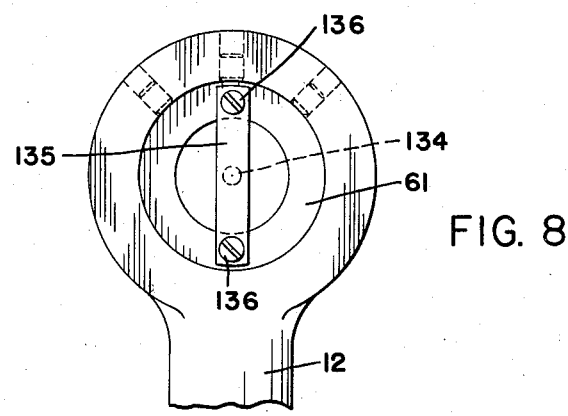
Fig. 8 is a transverse sectional view on line 8—8 of Fig. 5.

Referring to Figs. 1 and 4, the reel indicated generally at 10 is axially journaled in mounting posts 11 and 12 which preferably have attaching flanges 13 to secure them to a suitable support 14. The reel 10 has an annular spool formed of the opposed frusto-conical members 15 and 16, and end plates 17 and 18 are attached to the outer edges of the members 15 and 16 by screws 19. The inner edges of members 15 and 16 are connected by a motor mounting ring 20 which completes the reel housing.

The inner edge of member 15 may have a grooved flange 21 in which one end of the mounting ring 20 is received, the other end of the ring having a rabbeted projecting rim 22 to mount the end flange 23 of an electric motor 24 for driving the reel. Adjacent to the rim 22 on ring 20 is an annular flange 25 secured to the inner edge of spool member 16. The ring 20 forming the base of the spool is provided with a plurality of ventilating openings 26 extending radially therethrough, and may also be provided with openings 27 extending axially between openings 26 for circulating air from one end of the reel housing to the other, if desired. Plugs 28 may be screwed in one end of openings 27 to shut off air flow therethrough.

An electrical cord C or the like is adapted to be wound on the spool as indicated, and the other end of the cord connected to an electrical appliance at a remote location. The inner end of the cord is passed through the ring 20 of the spool into the reel housing and thence through the spool shaft 29 for connection to power supply lines leading to one of the supporting posts 11. An opening 30 is provided in the ring 20 for the cord, and a detachable clamping plate 31 sets in the ring adjacent to the opening 30 for pinching the cord at that point.

The outer end of shaft 29 is provided with an outturned annular flange 32 bearing against the side of the post 11, and an insulating cap 33 is mounted on said flange. The conductors from the end of cord C are connected one to a center contact 34 and one to a slip ring 35 on the cap. The power supply lines are connected to a socket 36 attached to post 11 by screws 37, and the lines make sliding electrical connection with the cord conductors by means of spring contacts 38 and 39.

The outer portion of the spool shaft 29 is journaled in a bushing 40 secured in post 11 and projecting inwardly therefrom into the reel housing, and the inner end portion of the shaft is secured in a flanged bushing 41 which is journaled in the inner end of bushing 40. The bushing 40 extends through an axial opening in end plate 17 and a sealing ring 42 is provided between the end plate and post 11 around said opening.

Adjacent its inner end, bushing 40 preferably has an annular flange 43 to which a contact mounting ring 44 may be attached. The ring 44 carries terminals 45 connected by conductors 46 to a snap switch 47 for the motor, which may be mounted on top of post 11. Spring contacts 48 on the terminals carry current to the switch from the contact rings 49 on a ring flange 49', which is carried on an annular flange member 50 secured to reel member 15 by bolts 51 and rotatable therewith. The contact rings 49 are connected in circuit with the motor 24 and the conductors of cord C by conductors 52 and 53. Alternatively, a three-wire cord could be used for supplying current to the reel motor and the appliance, and a switch provided at the outer end of the cord or on the reel for controlling the reel motor. This would require only the two slip rings 34 and 35. If the reel is used for an air hose, the hose H may be brought through a hole in the post 11 and the adjacent end of the reel housing utilized as an air chamber, to which the hose on the reel is connected by a hole 15' in flange member 15.

Preferably, the annular flange member 50 fits behind and is secured to flanged bushing 41 by screws 54, and a sealing ring 55 may be inserted between member 50 and the ring 44. A washer 56 may be located between the inner edge of member 50 and the inner end of bushing 40. As shown, the intermediate portion of shaft 29 may be reduced in diameter to provide an annular oil reservoir 57 between the end bearing portions of the shaft.

The end plate 18 of the reel housing preferably has an annular extension rim flange 18' attached to the spool member 16, and has an annular pulley flange 58 mounted thereon surrounding the spool shaft 59. The spool shaft 59 is journaled by bearing 60 in a sleeve bushing 61 which is secured in the upper end of post 12. The bushing 61 is journaled in pulley flange 58 by means of antifriction bearing 62 so that the reel housing to which the pulley is attached can rotate relative to the spool shaft 59.

A plate 64 holds a lubricant seal 65 against the outer surface of bearing 62 around bushing 61. Preferably, an outwardly flared conical member 66 is screwed into the inner end of bushing 61 and has an annular shoulder abutting the inner surface of bearing 62, and an O-ring 67 forms a seal between the member 66 and the pulley flange 58 inboard of the bearing 62. The inner end of conical member 66 has attached thereto by screws 68 a a radially extending bracket arm 69, and a shaft 70 is journaled in a bearing 71 mounted in said arm.

The inner end of the shaft 70 has a pulley 72 secured thereon, and the outer end has a pinion 73 secured thereon which meshes with a ring gear 74 mounted on the inner surface of end plate 18 concentric with shaft 59 and encircling the conical member 66. The pulley 72 is driven by a belt 75 from a rotary driving element or pulley 76 carried on the armature shaft 77 of motor 24. The reel housing is accordingly driven by shaft 77 in the direction opposite to the direction of rotation of the shaft 77, and the torque reaction exerted by the motor on its field and housing urges the reel to rotate in the same direction as it is driven by the armature shaft.

The armature shaft 77 has splined thereon the hub 78 of a cooling fan having blades 79 on its periphery for circulating air through holes 23' and around the motor, air being exhausted through holes or slots 80 in end plate 18 and drawn in through the holes 26 in the spool ring 22.

The fan hub 78 has screwed thereon one end of a rotary pump member 81 in the other end of which diametrically opposite vanes 82 are urged radially outward by springs 83 (Fig. 3). The pump member 81 is journaled in the pulley member 76 which forms a casing for the pump, and a lubricant washer 84 engirdles the hub and is held thereon by a cap 85 screwed onto the pulley 76.

The pulley 76 has an eccentric counterbore 86 in which the vanes 82 rotate, and inlet and exhaust ports 87 and 88 in the pulley member communicate with the counterbore at proper locations circumferentially to circulate a fluid such as oil in the direction of the arrows in Fig. 1. The outer peripheral portion of the face of pulley member 76 abuts the inner divergent portion 89 of the spool shaft 59, and is secured thereto by screws 90 with an O-ring seal 91 between the abutting surfaces. The divergent portion 89 of the shaft is hollow and communicates with the ports 87 and 88 to form an oil circulating chamber 92 for the pump. Thus the pulley member 76 and divergent portion 89 of the shaft together form a casing for a closed fluid conduit system connecting the inlet and exhaust sides of the pump.

A cap 93 fits in the divergent portion 89, and the outer end of pump member 81 rotatably abuts the face of the cap. A hole 94 in the periphery of the cap registers with the exhaust port 88, and a radial tube 95 connects the inlet port 87 with the hollow hub 96 of the cap. A tapered valve head 97 fits in the hub 96 to restrict the flow of oil from chamber 92 through the tube 95.

The stem 98 for valve head 97 is slidably mounted in shaft 59 for adjustment axially thereof, and the outer end of the stem is secured in an adjusting nut 99 which is screwed in a plate 100 attached by screws 101 to the end of sleeve bushing 61 and rotatable with the bushing in supporting post 12. Thus, rotation of the adjusting nut 99 will adjust the size of the restricted opening around the valve head 97.

A bleed opening 102 for the oil in chamber 92 is preferably provided axially of the valve head 97 and stem 98. The opening 102 opens into an enlarged passageway containing a ball shut-off 103 backed by a spring 104. A ball 105 at the outer end of stem 102 seats on the outlet port 106 from the passageway for the spring, but the seat is grooved to allow slight seepage around the ball. A hollow socket head screw 107 in the nut 99 holds the ball in place.

Accordingly, when the pump 81 and pulley 76 are assembled on the inner end of shaft 59, the valve stem can be removed to fill the pump chamber and oil chamber 92 with oil. When the valve stem is inserted excess oil can escape through the bleed opening 102 and outlet port 106. In the same manner, if the oil expands due to temperature conditions, the excess pressure is relieved through the bleed opening.

In the operation of the improved reel, assuming that the motor 24 rotates the armature shaft 77 counterclockwise, as veiwed from the left end of Fig. 1, the torque reaction on the motor field and housing will tend to rotate the reel which is attached to the motor housing in the opposite direction on its bearings in the posts 11 and 12. At the same time, the rotation of the armature shaft rotates the cooling fan blades 79 and the pump cylinder 81 in a counterclockwise direction. Now, if the armature shaft 77 were fixed to the pulley 76, it would drive the pinion 73, through belt 75 and pulley 72, in a counterclockwise direction and rotate the ring gear 74 and reel housing in a clockwise direction (the same direction as it is rotated by torque reaction). However, the speed of rotation is reduced according to the gear ratio between pinion 73 and ring gear 74, and the differential rotation of the reel housing and the armature shaft is provided for by journaling the housing on the outside of bushing 61 and the spool shaft 59 on the inside thereof. Under such conditions, when the load on the reel exceeded the capacity of the motor and stopped rotation of the reel, the motor would stall, and if not shut off, would burn out.

As shown in Figs. 1 and 3, as the pump cylinder 81 is rotated by the armature shaft, the vanes 82 circulate oil through port 88 into chamber 92, through the restricted orifice around valve 97, tube 95 and port 87 back into the pump cylinder. If the restricted orifice were completely closed circulation of oil would be stopped and the pulley would turn with the pump in the same manner as though it were fixed thereon. However, as shown in Fig. 1, the valve 97 at its innermost position provides a small restricted orifice, so that it is never completely closed.

Now, as the pump cylinder rotates the vanes 82 provide a fluid drive to rotate the pulley 76 counterclockwise at a speed somewhat less than that of the pump cylinder depending upon the extent of circulation of the oil as regulated by the size of the orifice around valve head 97. In other words, the smaller the orifice, the nearer the speed of the pulley approaches that of the pump as driven by the armature shaft 77. In the event the load on the reel becomes greater than the capacity of the reel as driven by the motor, which is the total of the power transmitted by the fluid drive and the power transmitted by the reaction torque on the motor field, the fluid drive cushions the pull on the reel by allowing slippage between the pump cylinder 81 and the pulley 76, so that the motor can continue to run and circulate oil while the reel housing is stationary. The size of the orifice is adjusted by turning the nut 99 to adjust the capacity of the reel for a desired purpose, thus controlling the power applied to the reel.

Accordingly, the motor can be kept running constantly to apply a uniform tension to the cord while the reel housing is stopped because of an overload or for any reason, without any danger of stalling and burning out the motor. Thus if the reel is used as a towing reel, a constant uniform cushioned tension can be maintained on the towing cable as it is continuously payed in and out, by constantly running the motor.

In order to apply a small amount of tension to the reel when the motor is stopped, so as to prevent the cord from unwinding for any reason, e. g., in case it is hanging downwardly from the reel, a ratchet device may be provided. Such device may include a pulley 108 mounted on a shaft 109 secured in post 12 by a nut 110. The pulley 108 is driven from pulley flange 58 on the reel housing by a belt 111 in the direction of the arrow in Fig. 1.

The pulley 108 has a bushing 112 secured in one side and journaled on the shaft 109, and a bushing 113 journaled in its other side and secured on the shaft. The two bushings have interlocking ratchet teeth as shown, and are urged together by a spring 114 on the shaft between the bushing 112 and post 12. Thus when the pulley 108 is driven by the belt 111, the bushing 112 will ratchet over the bushing 113 against the axial pressure of the spring 114, but movement of the pulley 108 in the opposite direction is prevented by the engagement of the ratchet teeth. When the pull or tension tending to unreel or pay out the cord exceeds the frictional resistance between the belt 111 and the pulley 108, the belt will slip and allow the cord to be payed out.

In the form of the invention shown in Figs. 5-8, the cushioning fluid used to transmit the drive from the armature shaft to the reel housing is air instead of oil. In this embodiment the armature shaft 77 has secured thereon by a nut 77' the hub 117 of a fan having blades 118 on the outer rim of its web 119, which is closely adjacent to but spaced from the motor flange 23. Coaxial with the fan 117 is an opposed complemental fan disk and driving member 120 having a series of radial blades 121 for fitting radially inward of the blades 118, and having an outer circumferential rim 122 closely surrounding the outer edges of blades 118.

As seen in Fig. 5, the configuration of the blades 121 and rim 122, together with the connecting portion of the fan disk, is such as to closely conform to the outline of the blades 118 and the adjacent portion of web 119. Accordingly, when the fans are axially spaced apart a proper distance, a substantially uniform clearance of small magnitude is provided all around the blades 118 and between those blades and the adjacent elements of the fan 120.

The hub 124 of fan 120 is journaled by suitable antifriction bearings 125 on a bushing 126, and, between the blades 121 and the hub, the fan disk 120 is provided with a series of openings 127. The outer surface of hub 124 provides a pulley or rotary driving element for driving a belt 128. The bushing 126 is coaxial with armature shaft 77 and its outer end is screwed into the hub 129 of a supporting disk 130 having circularly arranged holes 131 therein.

The outer rim of the supporting disk 130 is secured by screws 132 to the inner rim of conical member 66 which is screwed into the bushing 61 on which the pulley flange 58 of the reel housing plate 18 is journaled by antifriction bearing 62. The bracket arm 69 is also attached by screws 132 to the member 66, and the arm carries the shaft 70 on which the pulley 72 and pinion 73 are mounted, as previously described in connection with Fig. 1. Consequently, it will be seen that the oil pump unit of Fig. 1 is easily replaced by the air fan assembly of Fig. 5, by removing the reel housing end plate 18, the adjusting nut 99 and valve tube 98 assembly, and mounting the air fan unit on the armature shaft and conical member 66 after detaching the oil pump unit therefrom.

As shown in Fig. 5, a socket wrench 134 is provided for engaging in a socket in the end of bushing 126, to adjust fan 120 toward and away from fan 119 by screwing the bushing 126 in or out of hub 129, and the outer end of wrench 134 is secured in a cross head 135 detachably connected to the end of bearing bushing 61 by screws 136. Thus, the wrench can be secured every half turn to hold the fan 120 in various adjusted positions, with different spacing between the blades 118 and 121. Obviously, the greater the spacing the less power is fluidly transmitted to the blades 121 of the driving member fan 120.

In the operation of the form of the invention shown in Figs. 5-8, the armature shaft 77 rotates fan 119 counterclockwise, as viewed in Fig. 7, and the blades 118 suck in air axially of the fan through conical bushing 66, and through holes 131 in supporting disk 130 and through holes 127 in fan 120. This air is expelled radially outward of the blades 118 through a circumferential series of ports 138 in the rim 122 of fan 120. The ports 138 are open adjacent to the outer edges of blades 118, and are directed substantially axially inward therefrom to the inner side of rim 122 where they discharge adjacent to the ends of openings 27 in the spool ring 20.

As shown in Fig. 7, the ports 138 may be slightly inclined circumferentially as well as radially, so that the air discharging therefrom strikes the openings 27 at a slight angle and tends to rotate the reel housing in the opposite direction from the rotation of the armature shaft. In such case the plugs 28 would be removed from the openings 27, and suitable openings would be provided in the post 11 around bushing 40 to exhaust air from the adjacent side of the reel housing. Air exhausting from the ports 138 can also pass out of the openings 80 in the end plate 18 of the reel housing.

As the air is drawn through the openings 127 in fan disk 120 past the blades 121, it passes between the blades 121 and 118, and induces the blades 121 to rotate in the same direction as blades 118, but at speed somewhat less than that of fan 119 depending upon the amount of clearance and hence the amount of air cushion between the blades 121 and 118. The less the amount of clearance the nearer the speed of fan 120 and its pulley 124 approaches the speed of the fan 119 as driven by the armature shaft 77.

Now, in the event the load on the reel becomes greater than the capacity of the reel, the fluid drive, which in this case is the air flowing between the blades of the two fans, cushions the pull of the reel by allowing slippage between the fan 119 and fan 120, so that the motor can continue to run and circulate air while the reel housing is stationary.

Both embodiments of the invention consequently provide a compact, power driven reel having the drive motor within the reel housing, a reel which maintains uniform cushioned tension on the linear element being reeled and unreeled, which will not stall the drive motor due to overload, which combines the direct torque on the motor armature with the reaction torque on the field so as to control the applied power, and which is suitable for retrieving, winching and driving various linear elements.

What is claimed is:

1. A power driven reel having a support and a housing rotatable therein, a drive motor for the reel having its housing secured to and in the reel housing and its armature shaft projecting from the motor housing into the reel housing, a hollow driving element rotatably mounted in said reel housing, fluid drive means within said driving element and operatively connecting said armature shaft and driving element, and means connecting said driving element to said reel housing to rotate it in the direction opposite to the direction of rotation of the armature shaft as driven by the motor.

2. A power driven reel having a support and a housing rotatable therein, a drive motor for the reel having its housing secured to and in the reel housing and its armature shaft projecting from the motor housing into the reel housing, a hollow driving element rotatably mounted in said reel housing axially of said armature shaft, fluid drive means within said driving element and operatively connecting said armature shaft and driving element so as to allow slippage therebetween under a predetermined load on the reel housing, and means connecting said driving element to said reel housing to rotate it in the same direction as it is urged by the torque reaction from the armature shaft on the motor housing.

3. A power driven reel having a support and a housing rotatable therein, a drive motor for the reel having its housing secured to and in the reel housing and its armature shaft projecting from the motor housing into the reel housing, a hollow driving element rotatably mounted in said reel housing axially of said armature shaft, fluid drive means within said driving element and operatively connecting said armature shaft and driving element so as to allow slippage therebetween under a predetermined load on the reel housing, and means connecting said driving element to said reel housing to rotate it at reduced speed in the same direction as it is urged by the torque reaction from the armature shaft on the motor housing.

4. A power driven reel having a support and a housing rotatable therein, a drive motor for the reel having its housing secured to and in the reel housing and its armature shaft projecting from the motor housing into the reel housing, a hollow driving element rotatably mounted in said reel housing, fluid drive means within said driving element and operatively connecting said armature shaft and driving element and means connecting said driving element to said reel housing to rotate it at reduced speed in the direction opposite to the direction of rotation of the armature shaft as driven by the motor.

5. A power driven reel having a support and a housing rotatable therein, a drive motor for the reel having its housing secured to and in the reel housing and its armature shaft projecting from the motor housing into the reel housing, a hollow driving element rotatably mounted in said reel housing, fluid drive means within said driving element for transmitting a predetermined maximum amount of power from the armature shaft to said driving element and allowing slippage therebetween when the load exceeds said amount, means for adjusting said fluid drive means to vary said predetermined amount of power, and means for connecting said driving element to said reel housing to rotate it in a direction opposite to the rotation of the armature shaft.

6. A power driven reel having a support and a housing rotatable therein, a drive motor for the reel having its housing secured to and in the reel housing and its armature shaft projecting from the motor housing into the reel housing, a hollow driving element rotatably mounted in said reel housing axially of said armature shaft, fluid drive means within said driving element for transmitting a predetermined reduced amount of power from the armature shaft to said driving element and allowing cushioning therebetween when the load exceeds that amount, means for adjusting said fluid drive means to vary said predetermined amount of power, and means for connecting said driving element to said reel housing to rotate it at reduced speed in a direction opposite to the rotation of the armature shaft.

7. A power driven reel having a support and a housing rotatable therein, a drive motor for the reel having its housing secured to and in the reel housing and having an armature shaft, a hollow driving element rotatably mounted in said reel housing, fluid drive means within said driving element and operatively connecting said armature shaft and said driving element, an arm mounted on said support and extending radially of said reel housing, a stub shaft mounted in said arm, means operatively connecting said stub shaft to said driving element, and means operatively connecting said stub shaft to said reel housing to rotate it in the opposite direction from the direction of rotation of said armature shaft.

8. A power driven reel having a support and a housing rotatable therein, a drive motor for the reel having its housing secured to and in the reel housing and having an armature shaft, a hollow driving element rotatably mounted in said reel housing axially of said armature shaft, fluid drive means within said driving element and operatively connecting said armature shaft and said driving element so as to allow slippage therebetween under a predetermined load on the reel housing, an arm mounted on said support and extending radially of said reel housing, a stub shaft mounted in said arm, means operatively connecting said stub shaft to said driving element, and means operatively connecting said stub shaft to said reel housing to rotate it in the opposite direction from the direction of rotation of said armature shaft.

9. A power driven reel having a support and a housing rotatable therein, a drive motor for the reel having its housing secured to and in the reel housing and having an armature shaft, a hollow driving element rotatably mounted in said reel housing, fluid drive means within said driving element for transmitting a predetermined maximum amount of power from the armature shaft to said driving element and allowing slippage therebetween when the load exceeds that amount, an arm mounted on said support and extending radially within said reel housing, a stub shaft mounted in said arm, means operatively connecting said stub shaft to said driving element, and means operatively connecting said stub shaft to said reel housing to rotate in the opposite direction and at a reduced speed from that of the armature shaft.

10. A power driven reel having a support and a housing rotatable therein, a drive motor for the reel having its housing secured to and in the reel housing and having an armature shaft, a hollow driving element rotatably mounted in said reel housing, fluid drive means within said driving element for transmitting a predetermined maximum amount of power from the armature shaft to said driving element and allowing cushioning therebetween when the load exceeds that amount, means for adjusting said fluid drive means to vary said predetermined maximum amount of power, an arm mounted on said support and extending radially within said reel housing, a stub shaft mounted in said arm, means operatively connecting said stub shaft to said driving element, and means operatively connecting said stub shaft to said reel housing to rotate in the opposite direction and at a reduced speed from that of the armature shaft.

11. A power driven reel having a support and a housing rotatable therein, a drive motor for the reel having its housing secured to and in the reel housing and having an armature shaft, a fan secured on said shaft and having blades at its outer periphery, a driving element rotatably mounted in said reel housing and having fan blades closely adjacent to but spaced radially inward from said first fan blades whereby rotation of said first fan blades induces a flow of air past said inner blades providing a fluid drive connection between said fan and said driving element, means connecting said driving element to said reel housing to rotate it oppositely to the direction of rotation of the armature shaft as driven by the motor, and conduit means conducting outside air to the driving element fan blades at their radially inner edges.

12. A power driven reel having a support and a housing rotatable therein, a drive motor for the reel having its housing secured to and in the reel housing and having an armature shaft, a fan secured on said shaft and having blades at its outer periphery, a driving element rotatably mounted in said reel housing and having fan blades closely adjacent to but spaced radially inward from said first fan blades whereby rotation of said first fan blades induces a flow of air past said inner blades providing a fluid drive connection between said fan and said driving element, the outer periphery of said driving element closely surrounding said first fan blades and having a series of discharge apertures communicating therewith and directed substantially axially inward therefrom, means connecting said driving element to said reel housing to rotate it oppositely to the direction of rotation of the armature shaft as driven by the motor, and conduit means conducting outside air to the driving element fan blades at their radially inner edges.

13. A power driven reel having a support and a housing rotatable therein, a drive motor for the reel having its housing secured to and in the reel housing and having an armature shaft, a fan secured on said shaft and having blades at its outer periphery, a driving element rotatably mounted in said reel housing and having fan blades closely adjacent to but spaced radially inward from said first fan blades whereby rotation of said first fan blades induces a flow of air past said inner blades providing a fluid drive connection between said fan and said driving element, means for adjusting said driving element axially of said first fan to vary the spacing between the blades and the amount of power fluidly transmitted to the driving element, means connecting said driving element to said reel housing to rotate it oppositely to the direction of rotation of the armature shaft as driven by the motor, and conduit means conducting outside air to the driving element fan blades at their radially inner edges.

14. A power driven reel having a support and a housing rotatable therein, a drive motor for the reel having its housing secured to and in the reel housing and having an armature shaft, a fan secured on said shaft and having blades at its outer periphery, a driving element rotatably mounted in said reel housing and having fan blades closely adjacent to but spaced radially inward from said first fan blades whereby rotation of said first fan blades induces a flow of air past said inner blades providing a fluid drive connection between said fan and said driving element, the outer periphery of said driving element closely surrounding said first fan blades and having a series of discharge apertures communicating therewith and directed substantially axially inward therefrom, means for adjusting said driving element axially of said first fan to vary the spacing between the blades and the amount of power fluidly transmitted to the driving element, means connecting said driving element to said reel housing to rotate it oppositely to the direction of rotation of the armature shaft as driven by the motor, and conduit means conducting outside air to the driving element fan blades at their radially inner edges.

References Cited in the file of this patent

UNITED STATES PATENTS 2,443,763     Dahlgren et al. _____ June 22, 1948